(12) United States Patent
Hu et al.

(10) Patent No.: US 12,697,901 B2
(45) Date of Patent: Aug. 4, 2026

(54) THERMAL MANAGEMENT OF A BATTERY ASSEMBLY USING A CONFIGURABLE THERMAL INTERFACE

(71) Applicant: GM Global Technology Operations LLC, Detroit, MI (US)

(72) Inventors: Zhenwen Hu, Shanghai (CN); Jian Yao, Shanghai (CN); Chengwu Duan, Shanghai (CN); Yusheng Zou, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 644 days.

(21) Appl. No.: 18/300,842

(22) Filed: Apr. 14, 2023

(65) Prior Publication Data

US 2024/0286525 A1 Aug. 29, 2024

(30) Foreign Application Priority Data

Feb. 28, 2023 (CN) .......................... 202310182027.6

(51) Int. Cl.
B60L 58/24 (2019.01)
B60K 1/00 (2006.01)
(Continued)

(52) U.S. Cl.
CPC ................. B60L 58/24 (2019.02); B60K 1/04 (2013.01); B60L 50/66 (2019.02);
(Continued)

(58) Field of Classification Search
CPC ........... H01M 10/625; H01M 10/6566; H01M 10/658; H01M 10/486; H01M 10/613; H01M 10/6563; H01M 2220/20; H01M 50/249; H01M 50/271; H01M 50/296; B60L 58/24; B60L 50/66; B60L 58/10; B60K 1/04; B60K 2001/005; B60R 16/04; Y02E 60/10

See application file for complete search history.

(56) References Cited

U.S. PATENT DOCUMENTS

2012/0037439 A1 2/2012 Sujan et al.
2018/0331404 A1* 11/2018 Slama ............... H01M 10/6571

FOREIGN PATENT DOCUMENTS

DE 102008034887 A1 6/2009
DE 102012202328 A1 8/2013
DE 102019104130 A1 8/2020

OTHER PUBLICATIONS

Jesko et al., DE 102019104130 A1, Espacenet machine translation, 2019 (Year: 2020).*

* cited by examiner

*Primary Examiner* — Adam A Arciero
(74) *Attorney, Agent, or Firm* — CANTOR COLBURN LLP

(57) ABSTRACT

A system for thermal management of a battery assembly includes a protective cover in thermal communication with the battery assembly and disposed at a location that is proximate to an external surface of the battery assembly, the protective cover including at least one moveable component. The system also includes an actuator device configured to move the at least one moveable component of the protective cover to establish an insulating air gap between a portion of the protective cover and the battery system, the insulating air gap causing an increase in a thermal resistance of the protective cover.

20 Claims, 6 Drawing Sheets

(51) Int. Cl.
    B60K 1/04           (2019.01)
    B60L 50/60         (2019.01)
    H01M 10/625      (2014.01)
    H01M 10/6566    (2014.01)
    H01M 10/658      (2014.01)

(52) U.S. Cl.
    CPC ..... H01M 10/625 (2015.04); H01M 10/6566
        (2015.04); H01M 10/658 (2015.04); *B60K*
      *2001/005* (2013.01); *H01M 2220/20* (2013.01)

THERMAL MANAGEMENT OF A BATTERY ASSEMBLY USING A CONFIGURABLE THERMAL INTERFACE

INTRODUCTION

This application claims the benefit of Chinese Application No. 202310182027.6 filed on Feb. 28, 2023, the disclosure of which is incorporated herein by reference in its entirety. The subject disclosure relates to thermal control of batteries.

Vehicles, including gasoline and diesel power vehicles, as well as electric and hybrid electric vehicles, feature battery storage for purposes such as powering electric motors, electronics and other vehicle subsystems. In some cases, managing thermal properties of battery storage systems can be a challenge. For example, charging and discharging of batteries, as well as battery performance, can become limited in low temperature situations. Accordingly, it is desirable to provide a device or system that can provide thermal management capabilities in a variety of conditions.

SUMMARY

In one exemplary embodiment, a system for thermal management of a battery assembly includes a protective cover in thermal communication with the battery assembly and disposed at a location that is proximate to an external surface of the battery assembly, the protective cover including at least one moveable component. The system also includes an actuator device configured to move the at least one moveable component of the protective cover to establish an insulating air gap between a portion of the protective cover and the battery assembly, the insulating air gap causing an increase in a thermal resistance of the protective cover.

In addition to one or more of the features described herein, the battery assembly includes a vehicle battery pack having a plurality of battery cells, and the protective cover is configured to thermally insulate at least one of the vehicle battery pack and one or more of the plurality of battery cells.

In addition to one or more of the features described herein, the actuator device is configured to move the at least one moveable component between a first position and a second position, the first position causing the protective cover to insulate the battery assembly via the insulating air gap, and the second position causing the protective cover to open and permit air to flow through the protective cover.

In addition to one or more of the features described herein, the protective cover includes a cavity defined by opposing surfaces, the at least one moveable component includes a first component configured to isolate the cavity and establish the insulating air gap when in the first position, and the first component is configured to expose the cavity to permit air flow through the cavity when the first component is in the second position.

In addition to one or more of the features described herein, the at least one moveable component includes a second component that defines one of the opposing surfaces, and the actuator device configured to move the second component to adjust a thickness of the insulating air gap.

In addition to one or more of the features described herein, the system further includes a processing device configured to control the actuator device based on at least one of a request received from a vehicle user, a request received from a vehicle system, and an external temperature condition.

In addition to one or more of the features described herein, the battery assembly is disposed in a vehicle, and the protective cover is disposed in thermal communication with a housing of the battery assembly.

In addition to one or more of the features described herein, the protective cover is disposed below the housing and is exposed to an external air flow around the vehicle.

In another exemplary embodiment, a method of thermal management of a battery assembly includes providing a protective cover in thermal communication with the battery assembly and disposed at a location that is proximate to an external surface of the battery assembly, and controlling, by a processing device, an actuator device to move at least one moveable component of the protective cover to establish an insulating air gap between a portion of the protective cover and the battery assembly, the air gap causing an increase in a thermal resistance of the protective cover.

In addition to one or more of the features described herein, the actuator device is controlled to move the at least one moveable component between a first position and a second position, the first position causing the protective cover to insulate the battery assembly via the air gap, and the second position causing the protective cover to open and permit air to flow through the protective cover.

In addition to one or more of the features described herein, the protective cover includes a cavity defined by opposing surfaces, the at least one moveable component includes a first component configured to isolate the cavity and establish the insulating air gap when the first component is in the first position, and the first component is configured to expose the cavity to permit air flow through the cavity when the first component is in the second position.

In addition to one or more of the features described herein, the protective cover includes a second component that defines one of the opposing surfaces, and the controlling includes moving the second component to adjust a thickness of the air gap.

In addition to one or more of the features described herein, the controlling is based on at least one of a request received from a vehicle user, and a request received from a vehicle system In addition to one or more of the features described herein, the method further includes monitoring a temperature including at least one of an external temperature and a battery assembly temperature, where the controlling the at least one moveable component to establish the insulating air gap is based on the temperature being below a threshold temperature.

In addition to one or more of the features described herein, the battery assembly is disposed in a battery housing in a vehicle, the protective cover is disposed in thermal communication with a lower surface of the housing, and the protective cover is disposed between the housing and is exposed to an external air flow around the vehicle.

In yet another exemplary embodiment, a vehicle system includes a memory having computer readable instructions, and a processing device for executing the computer readable instructions, the computer readable instructions controlling the processing device to perform a method. The method includes receiving at least one of a request and an indication of a temperature condition, the processing device in communication with an actuator device connected to a protective cover, where the protective cover is in thermal communication with a battery assembly in a vehicle and the protective cover is disposed at a location that is proximate to an external surface of the battery assembly. The method also includes controlling, based on the at least one of the request and the temperature condition, the actuator device to move at least one moveable component of the protective cover to establish an insulating air gap between a portion of the protective cover and the battery assembly, the insulating air gap causing an increase in a thermal resistance of the protective cover.

In addition to one or more of the features described herein, the actuator device is controlled to move the at least one moveable component between a first position and a second position, the first position causing the protective cover to insulate the battery assembly via the insulating air gap, and the second position causing the protective cover to open and permit air to flow through the protective cover.

In addition to one or more of the features described herein, the protective cover includes a cavity defined by opposing surfaces, the at least one moveable component includes a first component configured to isolate the cavity and establish the insulating air gap when in the first position, the first component configured to expose the cavity to permit air flow through the cavity when in the second position.

In addition to one or more of the features described herein, the protective cover includes a second component that defines one of the opposing surfaces, and the controlling includes moving the second component to adjust a thickness of the insulating air gap.

In addition to one or more of the features described herein, the battery assembly is disposed in a battery housing in the vehicle, the protective cover is disposed in thermal communication with a lower surface of the housing, and the protective cover is disposed between the housing and is exposed to an external air flow around the vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIGS. 4A and 4B depict an embodiment of a thermal interface system having a moveable component for establishing an insulating air gap in conjunction with a cavity, in accordance with an exemplary embodiment;

DETAILED DESCRIPTION

Figure 1:
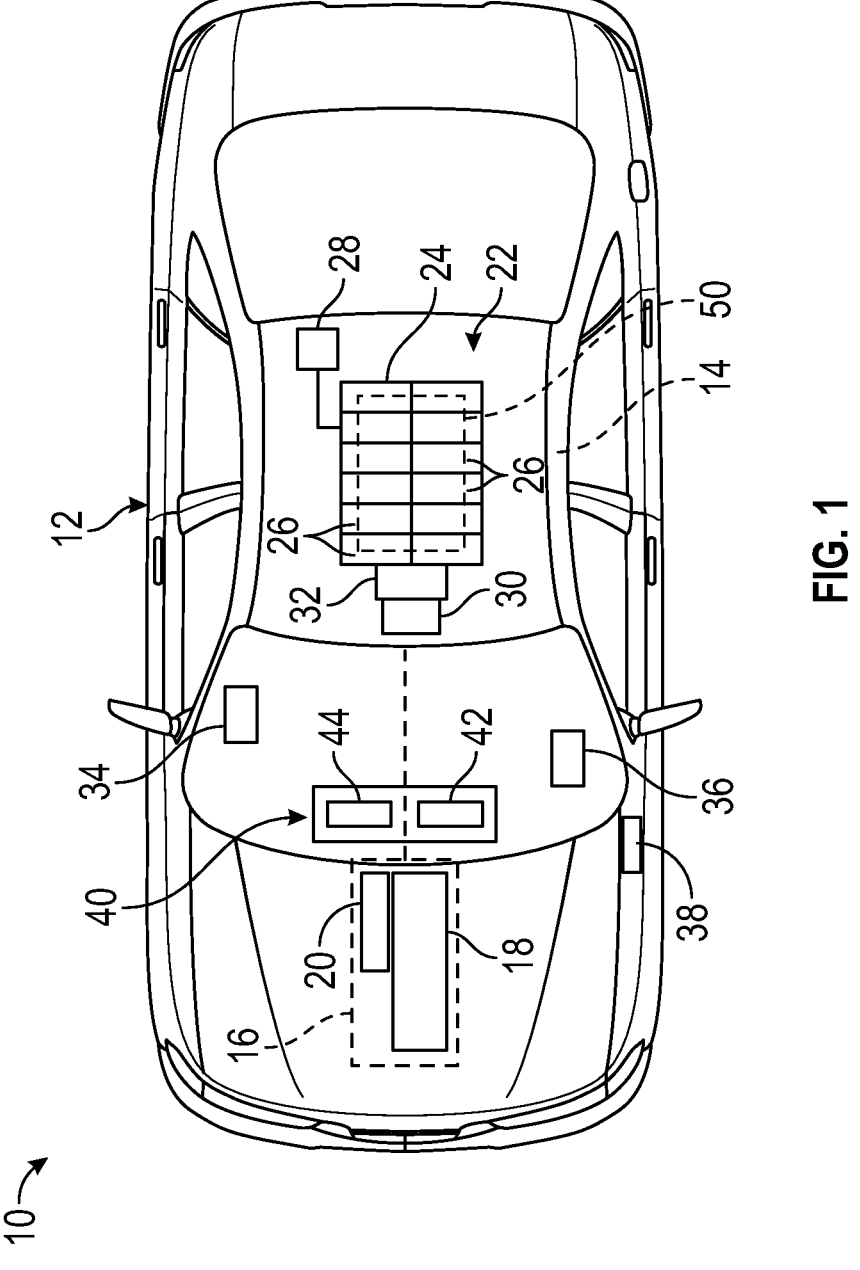
FIG. 1 is a top view of a motor vehicle, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, methods, devices and systems are provided for thermal management of a battery assembly or system, such as a battery pack in an electric or hybrid vehicle. An embodiment of a thermal management system includes a thermal interface system disposed at a location that is proximate to a battery assembly (i.e., positioned to be in thermal communication with at least a surface of the battery assembly).

The thermal interface system includes a protective cover disposed at a location that is proximate to a surface of a battery assembly, and a first component configured to be moved or actuated to establish an insulating air gap in the protective cover. An "insulating air gap" refers to an enclosed space (filled with ambient air, another gas and/or other insulating material). For example, the first component may be an outer cover that is moveable to establish the air gap.

In an embodiment, the protective cover includes a cover body that defines a cavity within the cover body, and the first component is at least one panel that is moveable by an actuator to a first position (an insulating position or closed position) in which the panel covers the cavity to isolate the cavity from external air flow. When the at least one panel is in the first position, the thermal interface system is in an "insulating mode". The at least one panel is moveable to a second position (an open position or conducting position) in which the cavity is open and air is permitted to flow through the protective cover. When the at least one panel is in the second position, the thermal interface system is in a "conducting mode".

In an embodiment, the thermal interface system is configured to establish an air gap having a variable volume or thickness. For example, a second component, such as a moveable tray, is moveable to increase or decreases a thickness of the cavity, thereby increasing or decreasing the thickness and volume of the insulating air gap. This variable volume can be utilized to adjust the thermal resistance of the air gap.

Embodiments described herein present numerous advantages and technical effects. The embodiments provide effective methods of adjusting or enhancing thermal resistance and/or thermal conductivity properties of battery systems, as well as easily and quickly adapting to various environmental conditions. For example, the embodiments provide a simple mechanism that can quickly provide additional insulation when low temperature conditions are encountered. In addition, the devices and systems described here can be readily incorporated into existing battery systems and vehicle systems without the need for significant redesign or modification of such battery and vehicle systems.

Other advantages include the ability to reduce the heating requirement for battery packs to extend driving range in cold weather, and enable faster warm-up to facilitate charging (e.g., DC fast charging) in cold weather. The embodiments can also provide additional protection to improve crashworthiness of a battery pack.

The embodiments are not limited to use with any specific vehicle and may be applicable to various contexts. For example, embodiments may be used with automobiles, trucks, aircraft, construction equipment, farm equipment, automated factory equipment, medical devices, power supply systems and/or any other device or system for which redundant grounding may be desired.

FIG. 1 shows an embodiment of a motor vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, a fuel injection subsystem, an exhaust subsystem and others.

The vehicle 10 may be a combustion engine vehicle, an electrically powered vehicle (EV) or a hybrid vehicle. In an embodiment, the vehicle 10 is a hybrid vehicle that includes a combustion engine system 18 and at least one electric motor assembly. In an embodiment, the propulsion system 16 includes an electric motor 20, and may include one or more additional motors positioned at various locations. The vehicle 10 may be a fully electric vehicle having one or more electric motors.

The vehicle 10 includes a battery system 22, which may be electrically connected to the motor 20 and/or other components, such as vehicle electronics. The battery system 22 may be configured as a rechargeable energy storage system (RESS). In an embodiment, the battery system 22 includes a battery assembly such as a high voltage battery pack 24 having a plurality of battery modules 26. The battery system 22 may also include a monitoring unit 28 that includes components such as a processor, memory, an interface, a bus and/or other suitable components.

The battery system 22 is electrically connected to components of the propulsion system 16. The propulsion system 16 includes an inverter module 30, and may also include a DC-DC converter module 32. The inverter module 30 (e.g., a traction power inverter unit or TPIM) converts direct current (DC) power from the battery system 22 to polyphase alternating current (AC) power (e.g., three-phase, six-phase, etc.) to drive the motor 20.

Various control modules (electronic control modules or ECUs) may be included in the vehicle 10. For example, an auxiliary power module (APM) 34 is included for providing power to accessories (e.g., 12-Volt loads). An on-board charging module (OBCM) 36 may be included, which electrically connects the battery system 22 to a charge port 38, and controls aspects of charging the battery system 22 (e.g., from a charging station or other vehicle) and/or providing charge to an external system (e.g., vehicle-vehicle charging).

The vehicle 10 also includes a computer system 40 that includes one or more processing devices 42 and a user interface 44. The various processing devices and units may communicate with one another via a communication device or system, such as a controller area network (CAN) or transmission control protocol (TCP) bus.

The vehicle 10 and/or the battery system 22 includes a configurable or adjustable thermal interface system 50. The thermal interface system 50, in an embodiment, includes an assembly that is controllable to establish an insulating air gap to provide additional thermal insulation in low temperature conditions, or otherwise as desired. The thermal interface system 50 may be all or part of a protective cover or protective housing. As discussed further herein, the interface system 50 can provide the additional insulation via an air gap having a fixed volume and thickness, or an adjustable air gap that can be controlled to adjust the heating resistance or thermal resistance of the interface system 50. The interface system 50 is also referred to as an interface 50.

Figure 2:
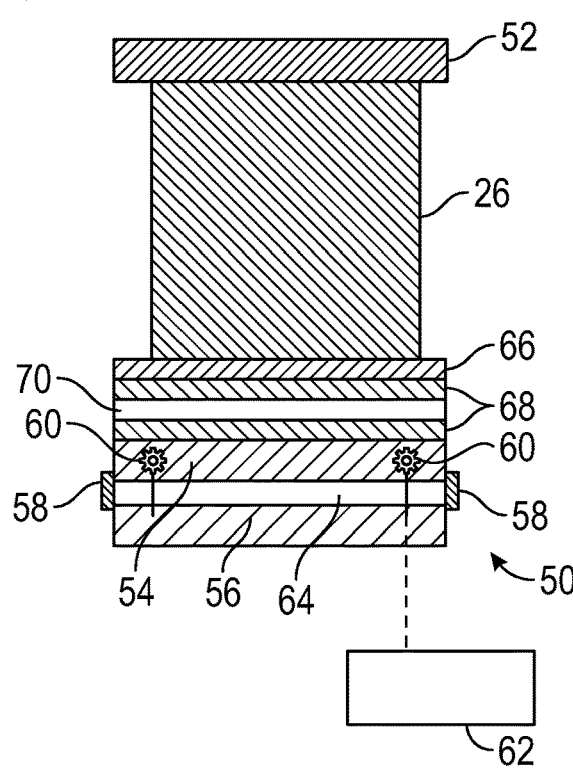
FIG. 2 depicts an embodiment of a thermal interface system in an insulating mode, in accordance with an exemplary embodiment.
Figure 3:
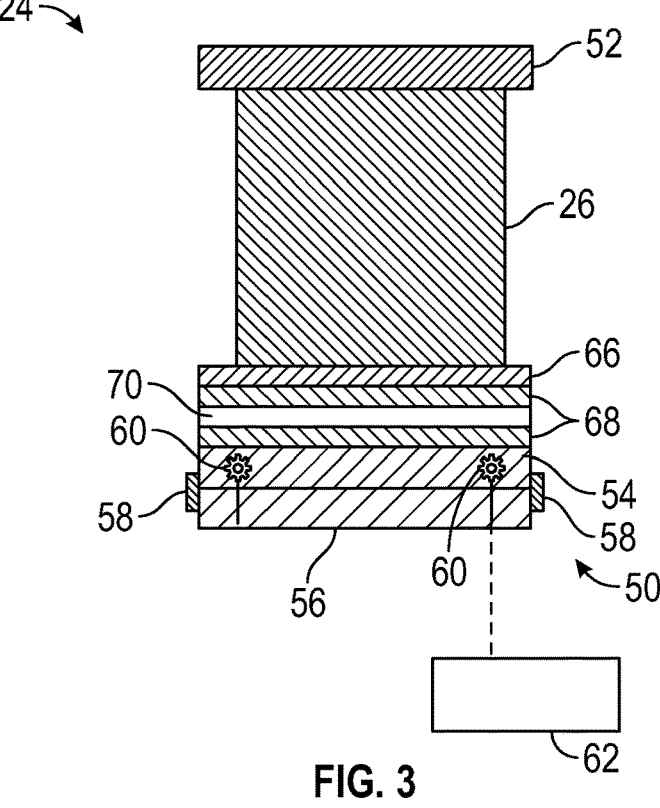
FIG. 3 depicts an embodiment of the thermal interface system of FIG. 2 in a conducting mode, in accordance with an exemplary embodiment.

FIGS. 2 and 3 depict an example of a portion of the battery pack 24 and components of an embodiment of the thermal interface system 50. The thermal interface system 50 is disposed at an upper or lower surface of the battery pack 24, and may be incorporated with other insulating or thermal management components. Although the thermal interface system 50 is discussed in conjunction with a single battery cell or battery module, embodiments are not so limited, as the thermal interface system 50 can be extended to cover an entire battery pack, a row of battery modules or a single module. In some examples, multiple thermal interface systems 50 (individually or collectively controllable) may be provided.

FIG. 2 depicts the thermal interface system 50 in an insulating mode in which an insulating air gap is formed, and FIG. 3 depicts the thermal interface system 50 in a conducting mode in which no air gap is formed. Thus, the thermal resistance provided in the insulating mode is greater than the thermal resistance provided in the conducting mode. The thermal resistance of heat dissipation paths from the battery pack 24 to ambient regions is higher when the thermal interface system 50 is in the insulating mode, as compared to the thermal resistance when the thermal interface system 50 is in the conducting mode.

In this example, the battery pack 24 is disposed in a battery pack housing, which includes a top cover 52 and a bottom cover 54. All or part of the bottom of the housing may form the thermal interface system 50.

The thermal interface system 50 includes a protective cover having one or more moveable components used to establish an insulating air gap and/or adjust an insulating air gap. The thermal interface system 50 (or components thereof) is disposed at a location that is proximate to the bottom cover 54 or other component of the battery pack 24 or housing (e.g., in contact with the bottom cover 54 or other component, or close enough to the bottom cover 54 or other component to provide for thermal communication).

For example, the bottom cover 54 is in the form of a housing tray, and the thermal interface system 50 includes an outer cover 56, a side cover 58 including side panels, and an actuator system that includes an actuator device 60. In this embodiment, the outer cover 56 is a moveable component.

The actuator device 60 may include any type of actuator (e.g., ball screw, rack and pinion) that can be controlled to move (e.g., vertically translate) the outer cover 56. The actuator device 60 may be moved manually, or may be connected to a controller 62. The controller 62 may be a dedicated processing device, or may be an existing processing device, such as the monitoring unit 28 of FIG. 1.

The actuator device 60 is controllable to move the outer cover 56 (which in FIG. 2 is vertically away from the bottom cover 54) and position the outer cover 56 a selected distance from the bottom cover (a second position) to establish an air gap 64 of a desired volume or thickness (e.g., about 5 mm). As shown in FIG. 2, the air gap 64 is an enclosed volume defined by surfaces of the bottom cover 54, the outer cover 56 and the side cover 58.

As shown in FIG. 3, when in the conducting mode, the outer cover 56 is in a second position in which the outer cover is at least substantially in contact with the bottom cover 54, so that no air gap is established. Two components are "substantially in contact" when the components are positioned so that there is no significant air gap or space. The components may be in physical contact with each other, or at least positioned so that any spaces or gaps are not significant or provide any appreciable thermal resistance.

Various embodiments of the thermal interface system 50 have been found to significantly increase the thermal resistance of a thermal management system. For example, the thermal resistance of an existing system can be increased by a factor of about 1 to 9 times, or higher, by incorporating the thermal interface system 50.

The thermal interface system 50 may be incorporated with other thermal management components or pre-existing thermal management components. An example of such components is shown in FIGS. 2 and 3, which include a thermal pad 66, and cold plates 68. A cooling fluid 70 (e.g., water) may be circulated or flowed between the cold plates 68 to facilitate heat removal from the battery pack 24.

Although the insulating air gap of various embodiments is described as using ambient air as an insulating material, the embodiments are not so limited. For example, if desired, an insulating material such as a plastic foam or mesh, or a compressible material may be included in the gap to enhance or control insulating properties of the gap.

Figures 4A, 4B:
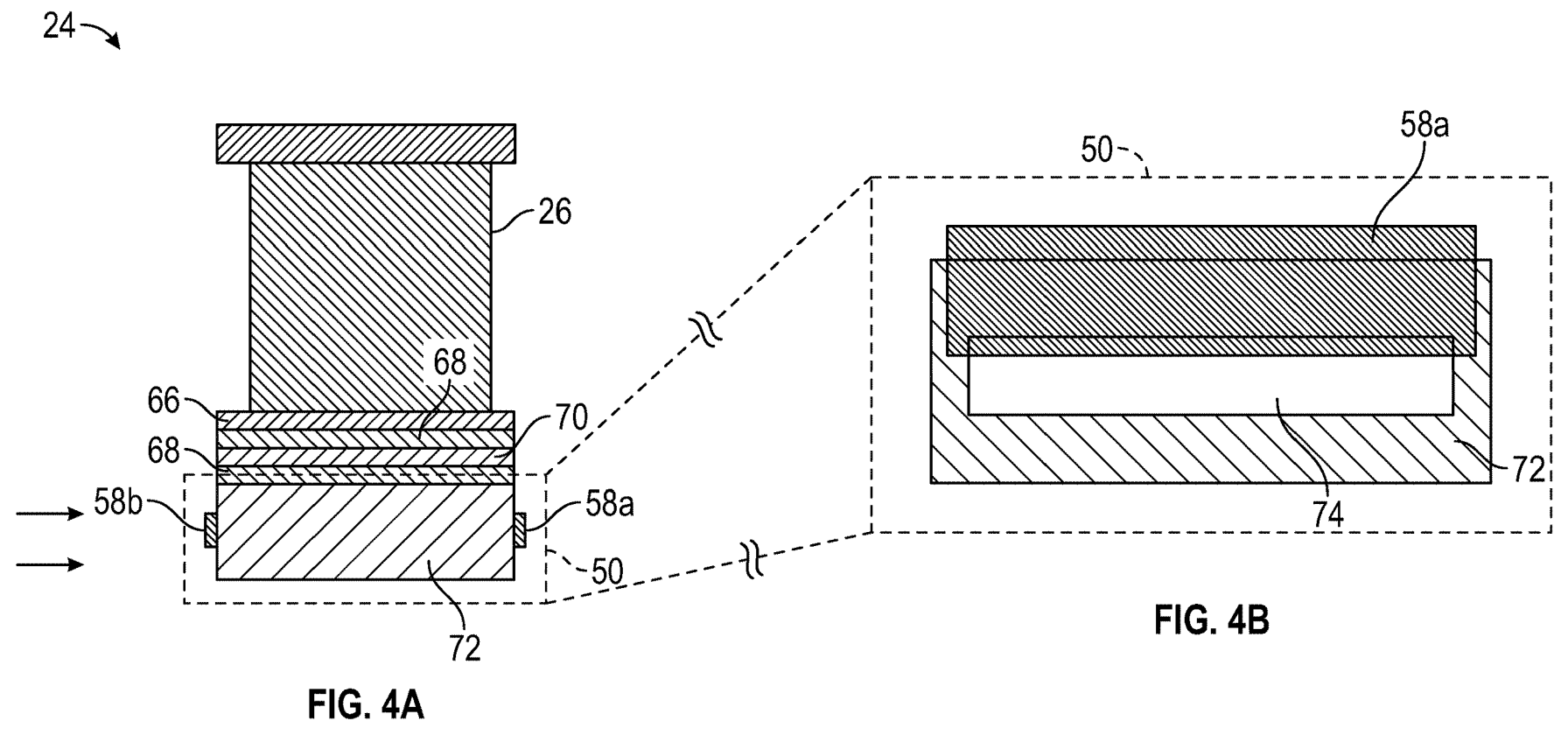

FIGS. 4A and 4B depict an embodiment of the thermal interface system 50, in which the side cover 58 is moveable to put the thermal interface system 50 in the insulating mode or the conductive mode. In the insulating mode, an enclosed air gap (insulating air gap) is established by putting the side cover 58 into a first position to provide additional thermal resistance. In the conducting mode, the side cover is in a second position and the insulating air gap is removed (e.g., by exposing the air gap to ambient regions).

FIG. 4A is a first view (e.g., a front view) of the interface system 50, and FIG. 4B is a second view (e.g., a side view) of the interface system 50. The interface system 50 is operable by the actuation device 60 (not shown) to move the side cover 58 and transition between the insulating mode (in which the side cover 58 is closed to establish an insulating air gap), and the conducting mode (in which the side cover 58 is opened to remove the insulating air gap).

As shown in FIG. 4A, the side cover 58 includes two side panels 58a and 58b disposed at opposing ends of an insulating body 72. The insulating body 72 is in thermal communication with the battery pack 24. In an embodiment, the insulating body 72 acts as part of the housing (i.e., integrates the functionality of the thermal interface system 50 with that of the bottom cover 54) and may be referred to as an integrated cover 72.

The insulating body 72 includes a cavity 74 that extends between the ends of the integrated cover 72. The cavity 74 acts as a conduit to permit air to flow through the cover 72 when the thermal interface system 50 is in the conducting mode (no insulating air gap).

In this embodiment, the thermal interface system 50 may be put into the insulating mode, in which the cavity 74 is enclosed to form the insulating air gap. The thermal interface system 50 may be put into the conducting mode in which there is no air gap, but instead the cavity 74 allows ambient air to flow through and out of the insulating body 72.

For example, to put the thermal interface system 50 into the insulating mode, the side panels 58a and 58b are moved to block the openings and substantially isolate the cavity 74. Air in the enclosed cavity 74 functions as an insulating layer.

To put the thermal interface system 50 into the conducting mode, one or both of the side panels 58a and 58b are raised or otherwise moved to expose the cavity 74 to ambient air. The conducting mode, in an embodiment, facilitates heat removal by allowing the ambient air to flow into and out of the interface system 50 and carry heat away from the battery pack 24. In the conducting mode, the thermal resistance R of the battery pack 24 is substantially unchanged, whereas in the insulating mode, the thermal resistance increases (e.g., the thermal resistance is up to 9*R for a 5 mm thick air gap, and may be higher for thicker air gaps).

The following is an example of a control strategy for transitioning the interface system 50 of FIGS. 4A and 4B in response to temperature conditions. In this example, a processing device receives measurements of ambient temperature (Ta) around the vehicle 10 (or information regarding current temperature, such as weather information). The processing device also receives measurements of the temperature (Tb) of the battery pack 24 (or modules therein), and coolant temperature (Tc).

If the ambient temperature Ta is greater than 20 degrees Celsius (° C.) and less than 40° C. (which is an optimum operating temperature for some batteries), the state of the thermal interface system 50 is unchanged.

If Ta is less than 20° C., the processing device compares Ta to the coolant temperature Tc. If Ta>Tc, the side panels 58a and 58b are opened (or remain open if the thermal interface system 50 is already in the conducting mode). If Ta<Tc, the side panels 58a and 58b are closed to establish the insulating air gap (or the thermal interface system 50 remains closed if already in the insulating mode).

If Ta is greater than 40° C., the processing device compares Ta to Tc, and the side panels 58a and 58b are opened if Ta<Tc. If Ta>Tc, the side panels 58a and 58b are closed to establish the insulating air gap (or maintained closed if the thermal interface system 50 is already in the insulating mode).

Figures 5A, 5B:
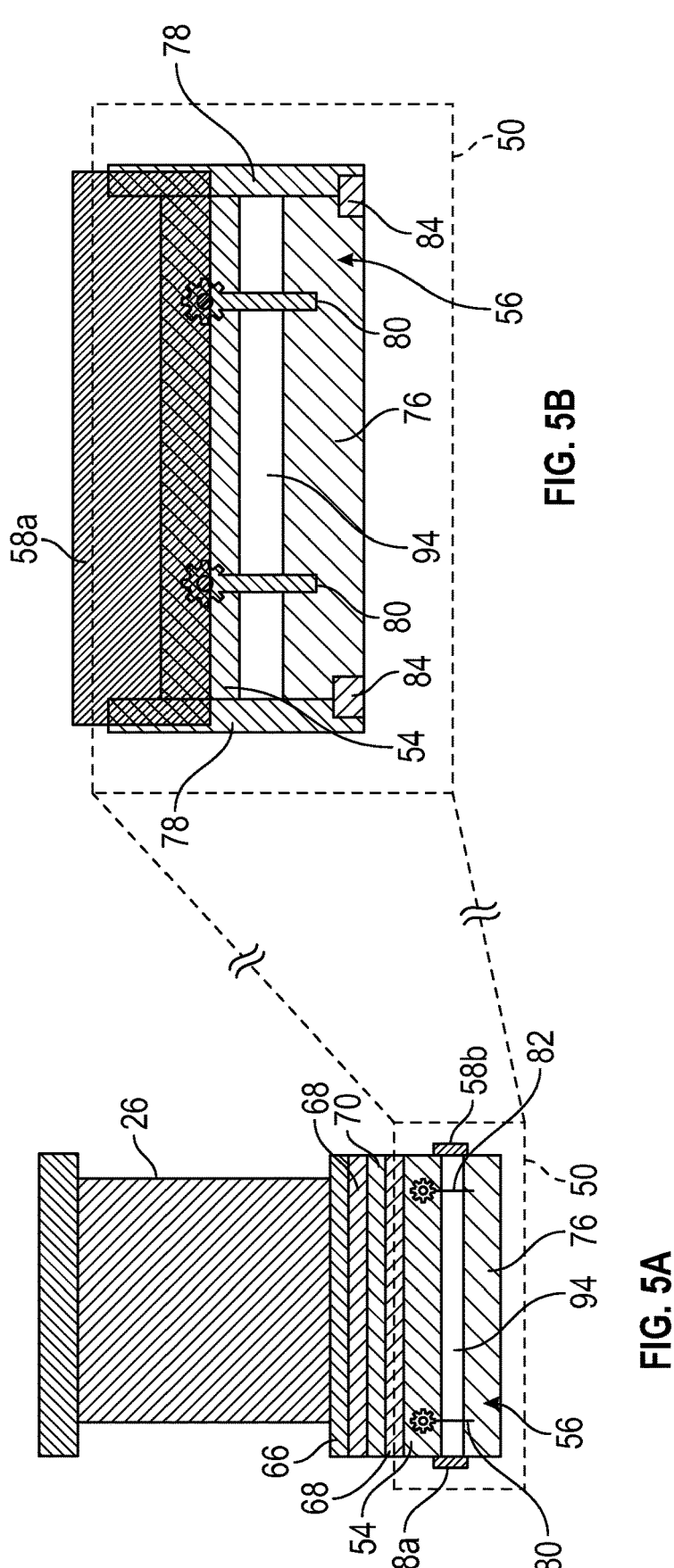
FIGS. 5A and 5B depict an embodiment of a thermal interface system having moveable components for establishing an insulating air gap and adjusting the insulating air gap to vary a thermal resistance of the air gap, in accordance with an exemplary embodiment.

FIGS. 5A and 5B depict an embodiment of the thermal interface system 50, in which the side covers 58a and 58b and a second component are moveable to enclose a cavity 94 and establish the insulating air gap, and to provide variable levels of thermal resistance. The thermal interface system 50 is operable by the actuation device 60 (or actuators 80 and 82 discussed further herein) to move the side panels 58a and 58b and transition between the insulating mode and the conducting mode. FIG. 5A is a first view (e.g., a front view) of the thermal interface system 50, and FIG. 5B is a second view (e.g., a side view) of the thermal interface system 50.

In this embodiment, the bottom cover 54 is partially enclosed in the outer cover 56, and a set of actuators are connected to a moveable cover portion 76. The cavity 94 is defined by the bottom cover 54 and moveable cover portion 76, as well as side portions 78 of the outer cover 56. In this embodiment, two pairs of actuators 80 and 82 are provided near the ends of the cavity 94; however, any configuration or number of actuators may be used. In addition, although the moveable cover 76 is discussed as being moveable, any configuration may be used that allows for changing a volume or thickness of the cavity 94. For example, the bottom cover 54 may be moveable (and the outer cover 56 may or may not have a moveable component).

The moveable cover portion 76 can be moved between an uppermost position, in which the cover portion 76 is at or near the bottom cover 54, and a lowermost position, in which the cover portion 76 is prevented from further movement by stop components 84. In this way, the thickness and volume of the cavity 94 can be adjusted to control the thermal resistance of the insulating air gap.

In this embodiment, the thermal interface system 50 has any number of insulating positions (in which each position corresponds to a different cavity thickness and air gap volume). The thermal interface system 50 can be put into the conducting mode by opening the side panels 58a and 58b and keeping the bottom cover 54 and the outer cover 56 separated to allow air flow. Alternatively, the conducting mode may be achieved by raising the moveable cover portion 76 to eliminate the cavity.

The following is an example of a control strategy for transitioning the thermal interface system 50 of FIGS. 5A and 5B in response to temperature conditions. In this example, a processing device receives measurements of ambient temperature Ta, the battery pack temperature Tb, and coolant temperature Tc.

If the ambient temperature Ta is greater than 20 degrees Celsius (° C.) and less than 40° C., the mode of the thermal interface system 50 is unchanged. If Ta is less than 20° C., the processing device compares Ta to the coolant temperature Tc. If Ta>Tc, no air gap is established (e.g., the side panels 58a and 58b are opened, or the cover portion 76 is moved to a position at or near the bottom cover 54 to substantially eliminate any opening or gap therebetween).

If Ta<Tc, the side panels 58a and 58b are closed to establish the insulating air gap (or the side panels 58a and 58b remain closed if the interface system 50 if already in the insulating mode). The thermal resistance is selected by positioning the cover portion 76 relative to the bottom cover 54 to establish a desired gap volume.

If Ta is greater than 40° C., the processing device compares Ta to Tc, and no air gap is established if Ta<Tc. If Ta>Tc, the side panels 58a and 58b are closed to establish the air gap (or the side panels 58a and 58b remain closed if the interface system 50 if already in the insulating mode) and the insulating air gap has a desired volume.

Figure 6:
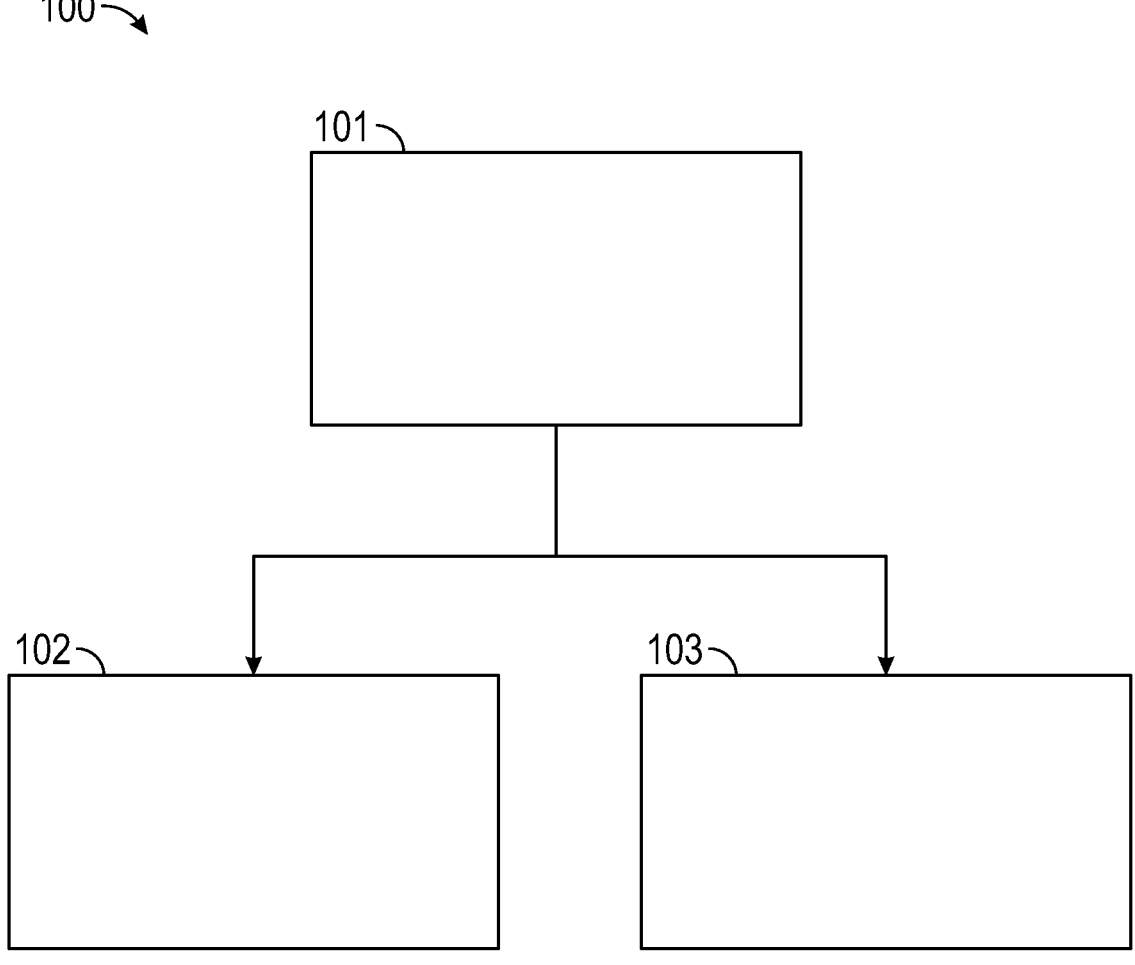
FIG. 6 is a flow diagram depicting aspects of a method of thermal management of a battery assembly, in accordance with an exemplary embodiment.

FIG. 6 depicts an embodiment of a method 100 of thermally managing a battery system or battery assembly. The method 100 may be performed in conjunction with the vehicle 10. However, the method 100 is not so limited and may be used with any suitable battery system. Aspects of the method 100 may be performed by a suitable processing device or combination of processing devices, such as the controller 62.

The method 100 includes a number of steps or stages represented by blocks 101-103. The method 100 is not limited to the number or order of steps therein, as some steps represented by blocks 101-103 may be performed in a different order than that described below, or fewer than all of the steps may be performed.

At block 101, the processing device receives a request for a change in thermal resistance, or receives an indication that a transition should be performed. For example, the processing device receives a request from a user (e.g., through the computer system 40), or receives a request from another vehicle system (e.g., the RESS system, a motor controller, etc.).

In an embodiment, the processing device monitors the vehicle 10 and/or conditions at and around the vehicle 10. For example, the processing device receives measurements of external temperature and puts the interface system 50 in an appropriate position as discussed at blocks 102 and 103.

The processing device is not limited to controlling the interface system 50 based on temperature. For example, the thermal interface system 50 can be put into a desired mode based on a vehicle operating mode (e.g., normal mode, high performance mode, etc.) and/or any other condition. Other conditions may include time of day, time of year and others. For example, the thermal interface system 50 can be put into the conducting mode (no insulating air gap) during the day and the insulating mode (having an insulating air gap) at night, or put into the insulating mode during cold months (winter mode) and the conducting mode during warm months (summer mode).

At block 102, the processing device controls the actuation device 60 to move at least one moveable component between an open position and a closed position. For example, if the processing device receives a request for additional thermal resistance, the actuation device 60 is controlled to move the moveable component(s) and establish an insulating air gap. In an embodiment, one or more components (e.g. the moveable cover portion 76) can be controlled to control or adjust the thickness or volume of the insulating air gap. In another example, if the thermal interface system 50 is in the insulating mode, and the processing device receives a request to reduce the thermal resistance, the processing device transitions the thermal interface system 50 to the conducting mode.

At block 103, the processing device, in response to detecting a change in conditions, operates the actuator device 60 to transition between the insulating mode and the conducting mode.

Figure 7:
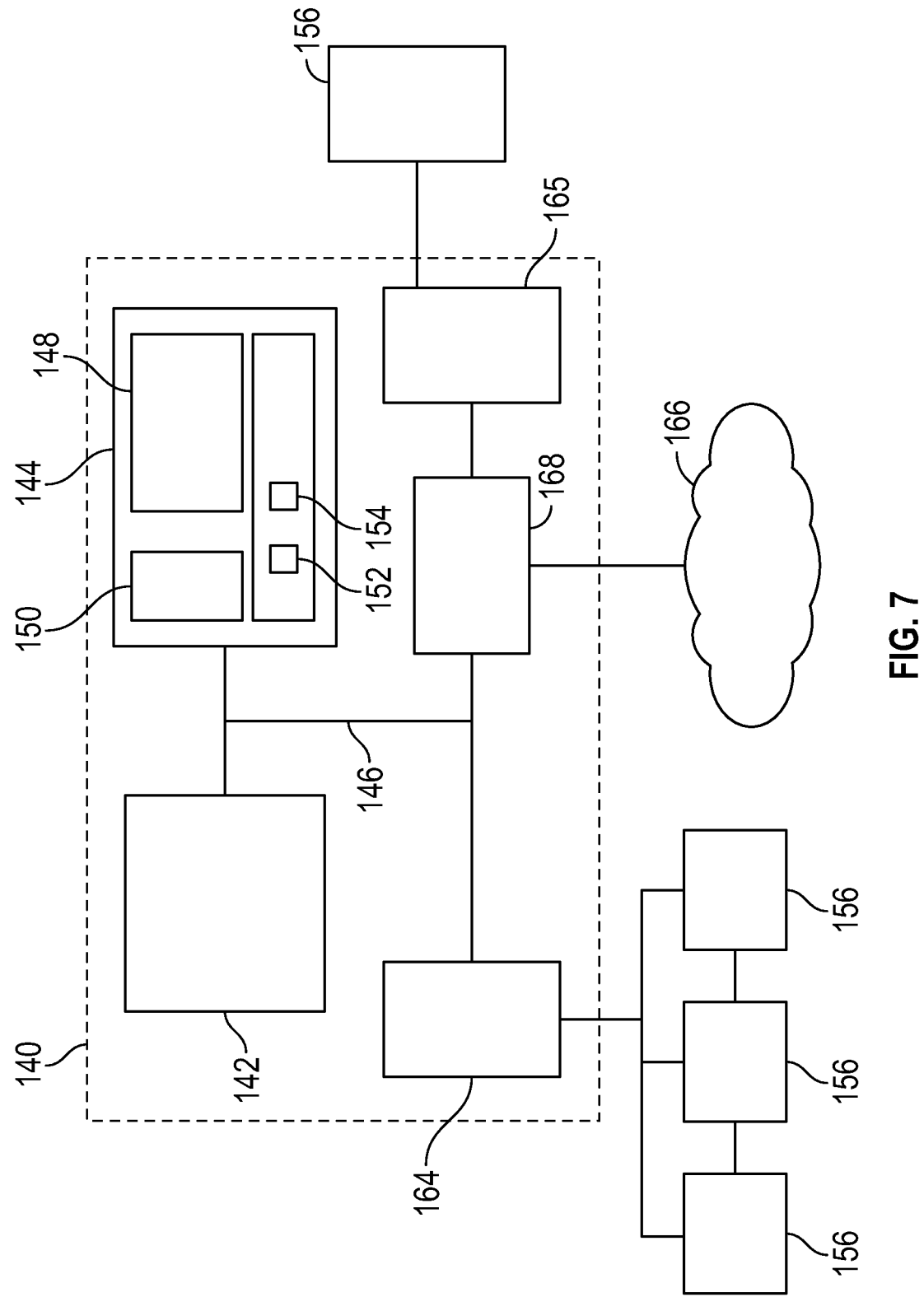
FIG. 7 depicts a computer system in accordance with an exemplary embodiment.

FIG. 7 illustrates aspects of an embodiment of a computer system 140 that can perform various aspects of embodiments described herein. The computer system 140 includes at least one processing device 142, which generally includes one or more processors for performing aspects of image acquisition and analysis methods described herein.

Components of the computer system 140 include the processing device 142 (such as one or more processors or processing units), a memory 144, and a bus 146 that couples various system components including the system memory 144 to the processing device 142. The system memory 144 can be a non-transitory computer-readable medium, and may include a variety of computer system readable media. Such media can be any available media that is accessible by the processing device 142, and includes both volatile and non-volatile media, and removable and non-removable media.

For example, the system memory 144 includes a non-volatile memory 148 such as a hard drive, and may also include a volatile memory 150, such as random access memory (RAM) and/or cache memory. The computer system 140 can further include other removable/non-removable, volatile/non-volatile computer system storage media.

The system memory 144 can include at least one program product having a set (e.g., at least one) of program modules that are configured to carry out functions of the embodiments described herein. For example, the system memory 144 stores various program modules that generally carry out the functions and/or methodologies of embodiments described herein. A module 152 may be included for performing functions related to monitoring temperature and other conditions, and a module 154 may be included to perform functions related to transitioning the thermal interface system 50 between modes as discussed herein. The system 140 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 142 can also communicate with one or more external devices 156 such as a keyboard, a pointing device, and/or any devices (e.g., network card, modem, etc.) that enable the processing device 142 to communicate with one or more other computing devices. Communication with various devices can occur via Input/Output (I/O) interfaces 164 and 165.

The processing device 142 may also communicate with one or more networks 166 such as a local area network (LAN), a general wide area network (WAN), a bus network and/or a public network (e.g., the Internet) via a network adapter 168. It should be understood that although not shown, other hardware and/or software components may be used in conjunction with the computer system 40. Examples include, but are not limited to: microcode, device drivers, redundant processing units, external disk drive arrays, RAID systems, and data archival storage systems, etc.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system for thermal management of a battery assembly, the system comprising:
   a thermal interface system in thermal communication with the battery assembly and disposed at a location that is proximate to an external surface of the battery assembly, the thermal interface system including at least one moveable component, wherein the at least one moveable component is moveable between a first position and a second position, the first position causing the thermal interface system to establish an insulating air gap between a portion of the thermal interface system and the battery assembly, and the second position causing the thermal interface system to open and permit air to flow through the thermal interface system;
   wherein the thermal interface system includes a cavity defined by opposing surfaces, the at least one moveable component includes a first component configured to isolate the cavity and establish the insulating air gap when in the first position, and the first component is configured to expose the cavity to permit air flow through the cavity when the first component is in the second position; and
   an actuator device configured to move the at least one moveable component between the first position and the second position, the insulating air gap causing an increase in a thermal resistance of the thermal interface system and insulating the battery assembly.

2. The system of claim 1, wherein the battery assembly includes a vehicle battery pack having a plurality of battery cells, and the thermal interface system is configured to thermally insulate at least one of the vehicle battery pack and one or more of the plurality of battery cells.

3. The system of claim 1, wherein the at least one moveable component includes an outer cover configured to be moved between the first position and the second position relative to a bottom cover pf the battery assembly.

4. The system of claim 1, wherein the at least one moveable component includes a side cover configured to be moved between the first position and the second position relative to an insulating body.

5. The system of claim 1, wherein the at least one moveable component includes a second component that defines one of the opposing surfaces, and the actuator device configured to move the second component to adjust a thickness of the insulating air gap.

6. The system of claim 1, further comprising a processing device configured to control the actuator device based on at least one of a request received from a vehicle user, a request received from a vehicle system, and an external temperature condition.

7. The system of claim 1, wherein the battery assembly is disposed in a vehicle, and the thermal interface system is disposed in thermal communication with a housing of the battery assembly.

8. The system of claim 7, wherein the thermal interface system is disposed below the housing and is exposed to an external air flow around the vehicle.

9. A method of thermal management of a battery assembly, the method comprising:
   providing a thermal interface system in thermal communication with the battery assembly and disposed at a location that is proximate to an external surface of the battery assembly, the thermal interface system including at least one moveable component, wherein the at least one moveable component is moveable between a first position and a second position, the first position causing the thermal interface system to establish an insulating air gap between a portion of the thermal interface system and the battery assembly, and the second position causing the thermal interface system to open and permit air to flow through the thermal interface system;
   wherein the thermal interface system includes a cavity defined by opposing surfaces, the at least one moveable component includes a first component configured to isolate the cavity and establish the insulating air gap when in the first position, and the first component is configured to expose the cavity to permit air flow through the cavity when the first component is in the second position; and
   controlling, by a processing device, an actuator device to move the at least one moveable component between the first position and the second position, the insulating air gap causing an increase in a thermal resistance of the thermal insulating system and insulating the battery assembly.

10. The method of claim 9, wherein the at least one moveable component includes an outer cover configured to be moved between the first position and the second position relative to a bottom cover pf the battery assembly.

11. The method of claim 10, wherein the at least one moveable component includes a side cover configured to be moved between the first position and the second position relative to an insulating body.

12. The method of claim 9, wherein the thermal interface system includes a second component that defines one of the opposing surfaces, and the controlling includes moving the second component to adjust a thickness of the air gap.

13. The method of claim 9, wherein the controlling is based on at least one of a request received from a vehicle user, and a request received from a vehicle system.

14. The method of claim 9, further comprising monitoring a temperature including at least one of an external temperature and a battery assembly temperature, wherein the controlling the at least one moveable component to establish the insulating air gap is based on the temperature being below a threshold temperature.

15. The method of claim 10, wherein the battery assembly is disposed in a battery housing in a vehicle, the thermal interface system is disposed in thermal communication with a lower surface of the housing, and the thermal interface system is disposed between the housing and is exposed to an external air flow around the vehicle.

16. A vehicle system comprising:

a memory having computer readable instructions; and a processing device for executing the computer readable instructions, the computer readable instructions controlling the processing device to perform a method including:

receiving at least one of a request and an indication of a temperature condition, the processing device in communication with an actuator device connected to a thermal interface system, wherein the thermal interface system is in thermal communication with a battery assembly in a vehicle and the thermal interface system is disposed at a location that is proximate to an external surface of the battery assembly, the thermal interface system including at least one moveable component, wherein the at least one moveable component is moveable between a first position and a second position, the first position causing the thermal interface system to establish an insulating air gap between a portion of the thermal interface system and the battery assembly, and the second position causing the thermal interface system to open and permit air to flow through the thermal interface system;

wherein the thermal interface system includes a cavity defined by opposing surfaces, the at least one moveable component includes a first component configured to isolate the cavity and establish the insulating air gap when in the first position, and the first component is configured to expose the cavity to permit air flow through the cavity when the first component is in the second position; and controlling, based on the at least one of the request and the temperature condition, the actuator device to move the at least one moveable component between the first position and the second position, the insulating air gap causing an increase in a thermal resistance of the thermal insulating system and insulating the battery assembly.

17. The vehicle system of claim 16, wherein the at least one moveable component includes an outer cover configured to be moved between the first position and the second position relative to a bottom cover pf the battery assembly.

18. The vehicle system of claim 16, wherein the at least one moveable component includes a side cover configured to be moved between the first position and the second position relative to an insulating body.

19. The vehicle system of claim 16, wherein the thermal interface system includes a second component that defines one of the opposing surfaces, and the controlling includes moving the second component to adjust a thickness of the insulating air gap.

20. The vehicle system of claim 17, wherein the battery assembly is disposed in a battery housing in the vehicle, the thermal interface system is disposed in thermal communication with a lower surface of the housing, and the thermal interface system is disposed between the housing and is exposed to an external air flow around the vehicle.

* * * * *